Figure 1:
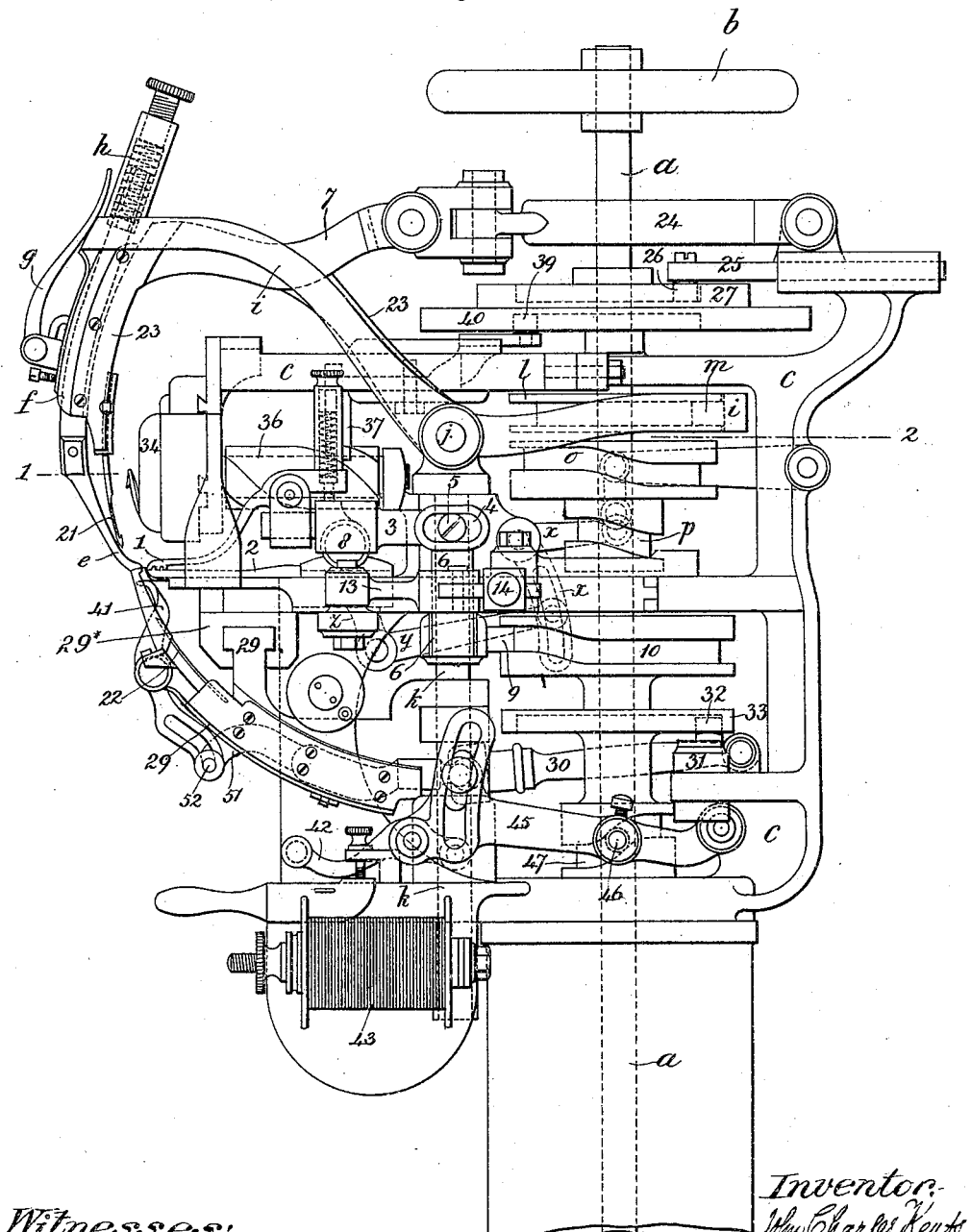

No. 806,744. PATENTED DEC. 5, 1905.
J. KEATS, DEC'D.
J. C. KEATS, ADMINISTRATOR
MACHINERY FOR MAKING BOOTS AND SHOES.
APPLICATION FILED SEPT. 10, 1903.

8 SHEETS—SHEET 1.

No. 806,744. PATENTED DEC. 5, 1905.
J. KEATS, DEC'D.
J. C. KEATS, ADMINISTRATOR.
MACHINERY FOR MAKING BOOTS AND SHOES.
APPLICATION FILED SEPT. 10, 1903.

8 SHEETS—SHEET 3.

No. 806,744. PATENTED DEC. 5, 1905.
J. KEATS, DEC'D.
J. C. KEATS, ADMINISTRATOR.
MACHINERY FOR MAKING BOOTS AND SHOES.
APPLICATION FILED SEPT. 10, 1903.

8 SHEETS—SHEET 4.

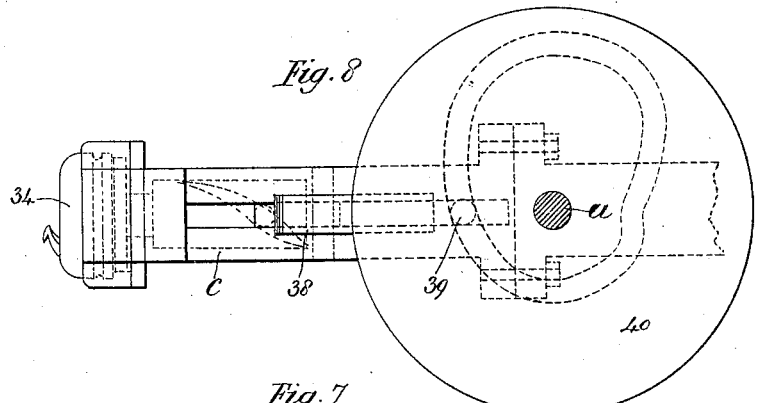
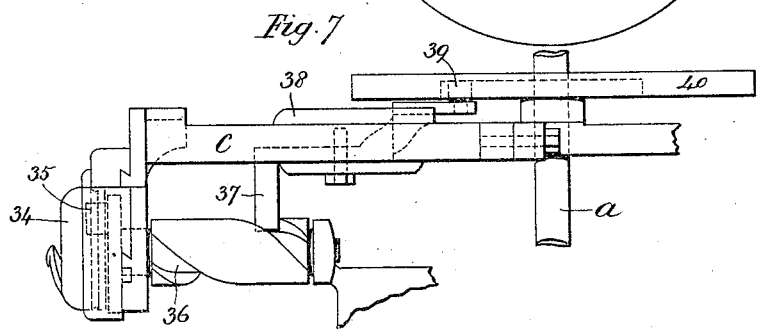
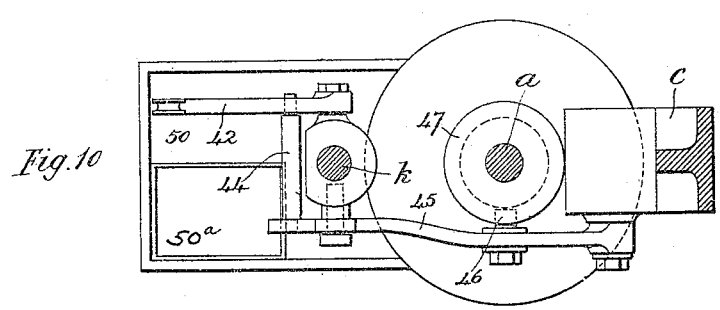
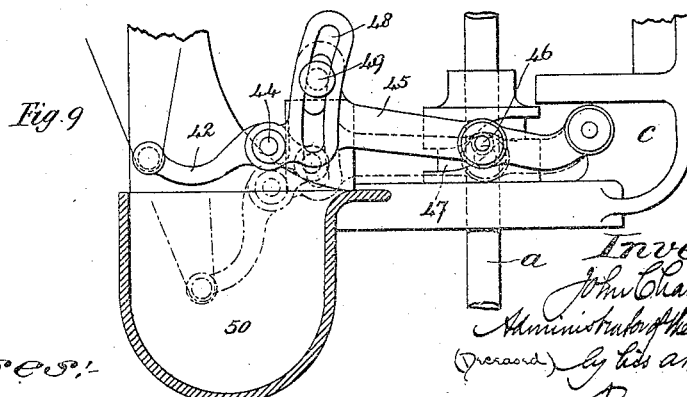

No. 806,744. PATENTED DEC. 5, 1905.
J. KEATS, DEC'D.
J. C. KEATS, ADMINISTRATOR.
MACHINERY FOR MAKING BOOTS AND SHOES.
APPLICATION FILED SEPT. 10, 1903.

8 SHEETS—SHEET 6.

No. 806,744. PATENTED DEC. 5, 1905.
J. KEATS, DEC'D.
J. C. KEATS, ADMINISTRATOR.
MACHINERY FOR MAKING BOOTS AND SHOES.
APPLICATION FILED SEPT. 10, 1903.
8 SHEETS—SHEET 7.
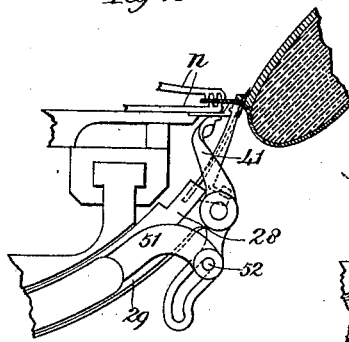
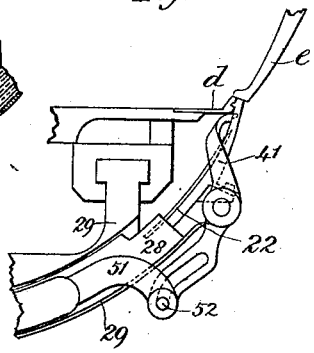
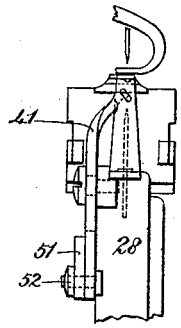
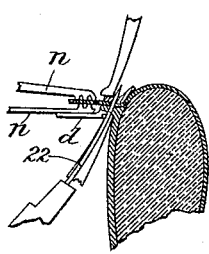
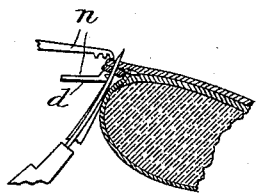
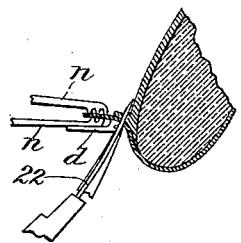
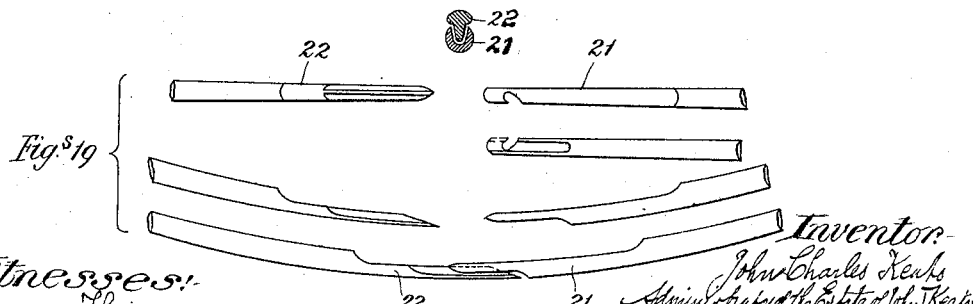

No. 806,744. PATENTED DEC. 5, 1905.
J. KEATS, DEC'D.
J. C. KEATS, ADMINISTRATOR.
MACHINERY FOR MAKING BOOTS AND SHOES.
APPLICATION FILED SEPT. 10, 1903.
8 SHEETS—SHEET 8.
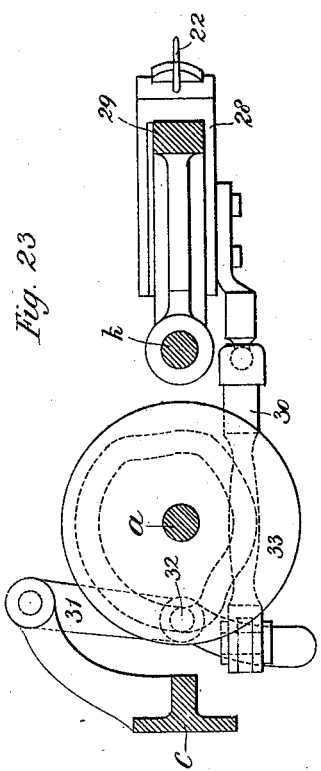
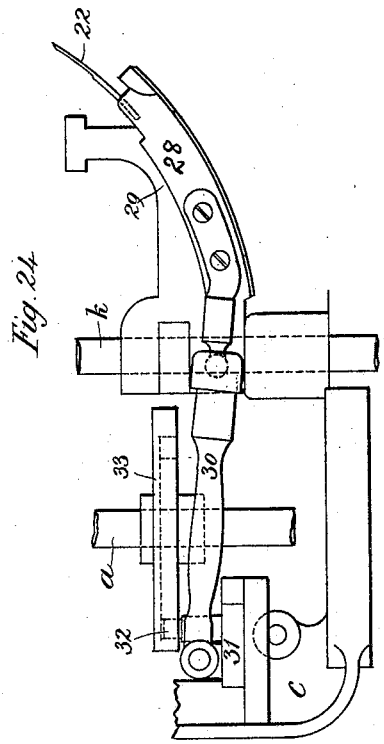
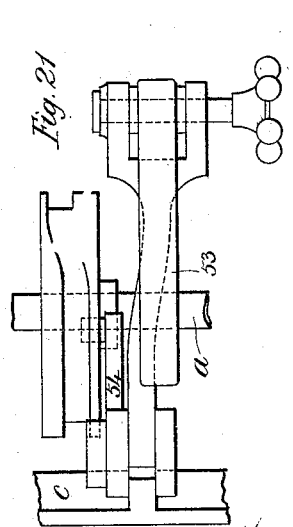
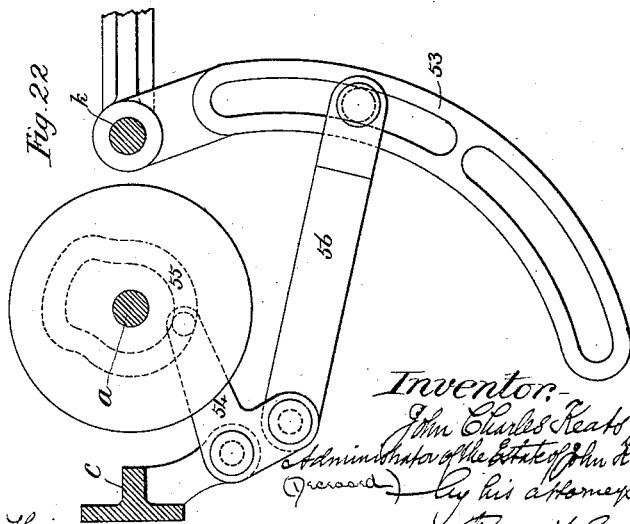

UNITED STATES PATENT OFFICE.

JOHN CHARLES KEATS, OF NORTHAMPTON, ENGLAND, ADMINISTRATOR OF JOHN KEATS, DECEASED, ASSIGNOR TO THE PHOENIX BOOT MACHINERY COMPANY LIMITED, OF STREET, ENGLAND.

MACHINERY FOR MAKING BOOTS AND SHOES.

No. 806,744.      Specification of Letters Patent.      Patented Dec. 5, 1905.

Application filed September 10, 1903. Serial No. 172,696.

*To all whom it may concern:*

Be it known that I, JOHN CHARLES KEATS, a subject of the King of Great Britain, and a resident of 37 Lutterworth road, Northampton, in the county of Northampton, England, am the administrator of the estate of JOHN KEATS, deceased, engineer, late of Bagnall, in the county of Stafford, England, who invented certain new and useful Improvements in Machinery for Making Boots and Shoes, of which the following is a specification.

The present invention relates to the manufacture of boots and shoes, and has for its object to provide in one apparatus or machine mechanism for lasting the uppers and sewing the same to the welt and insole (or to the sole alone when for turn-shoes) in a single operation.

The machine embodying the present improvements comprises two pairs of lasting pincers or grippers, which are operated positively by cams to grip the edge of the upper, which is fitted on the last and drawn by pincers around the same in a manner to remove and smooth out the creases, while the operation of sewing the upper to the insole and welt is effected by the sewing mechanism.

The machine is provided with means whereby the slipping of the work during the period between the release thereof by the grippers and their taking a fresh grip is prevented.

Further, the machine comprises piercing and sewing mechanism so timed with regard to the pincers and the other parts of the machine that the stitch is inserted immediately the work has been prepared by the lasting-pincers for its reception and the work is fed on the distance of another stitch immediately the release of the same by the pincers has taken place.

The awl employed to coöperate with the hook and the hook itself are both of peculiar form, so that the hole made for receiving the thread is provided with a tongue which when it engages with the sewing-thread is drawn back into the hole and tends to close it and make a better seam. The shuttle which is employed for carrying the locking-thread is a rotary one and is provided with an attachment whereby the tightening of the thread is efficiently performed.

Figure 2:
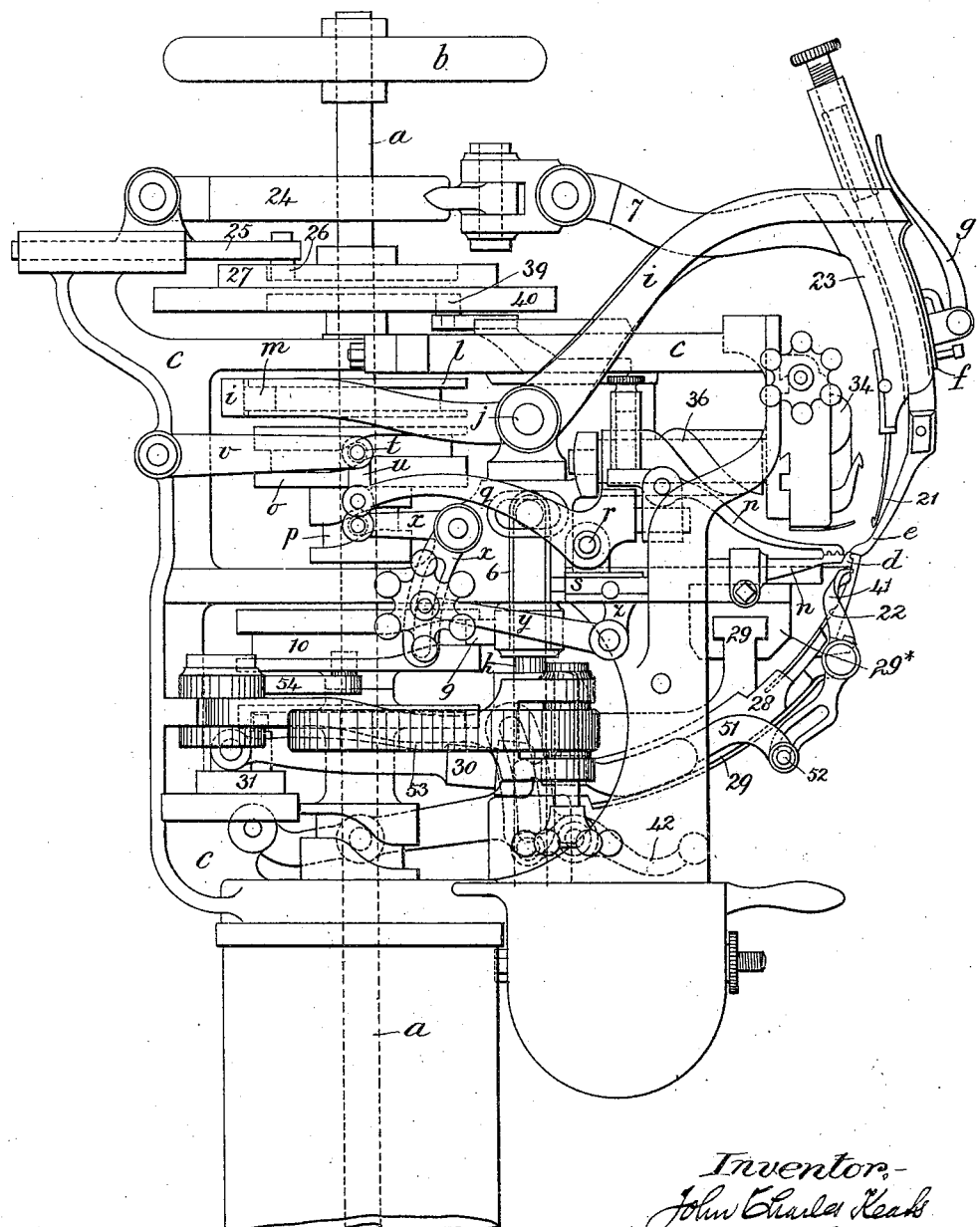
Figure 3:
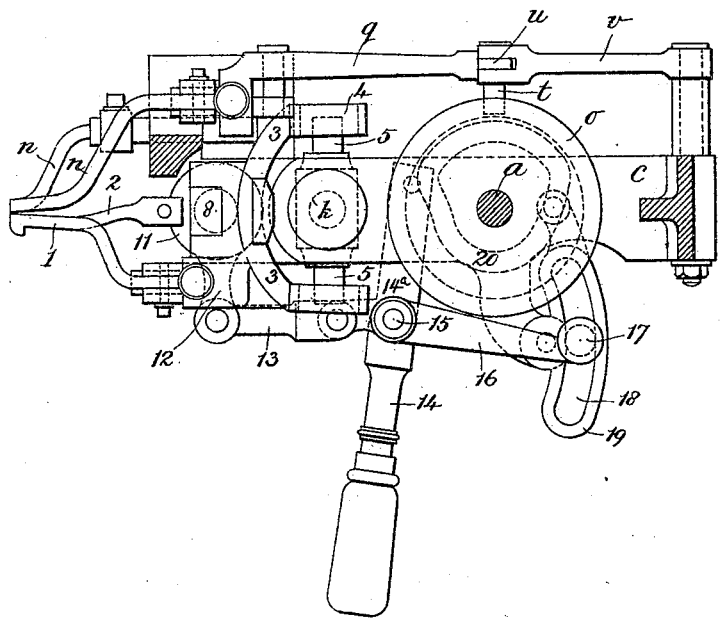
Figure 4:
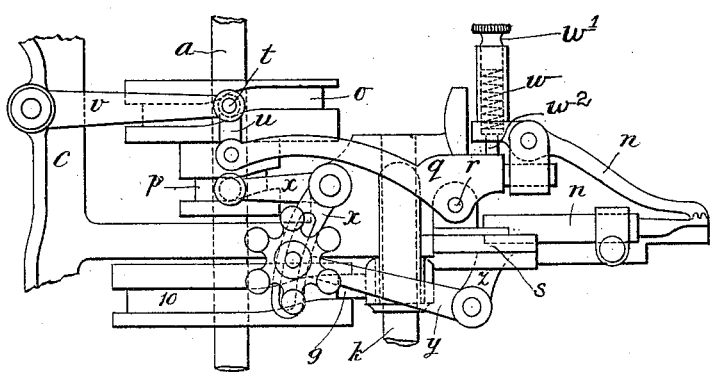
Figure 5:
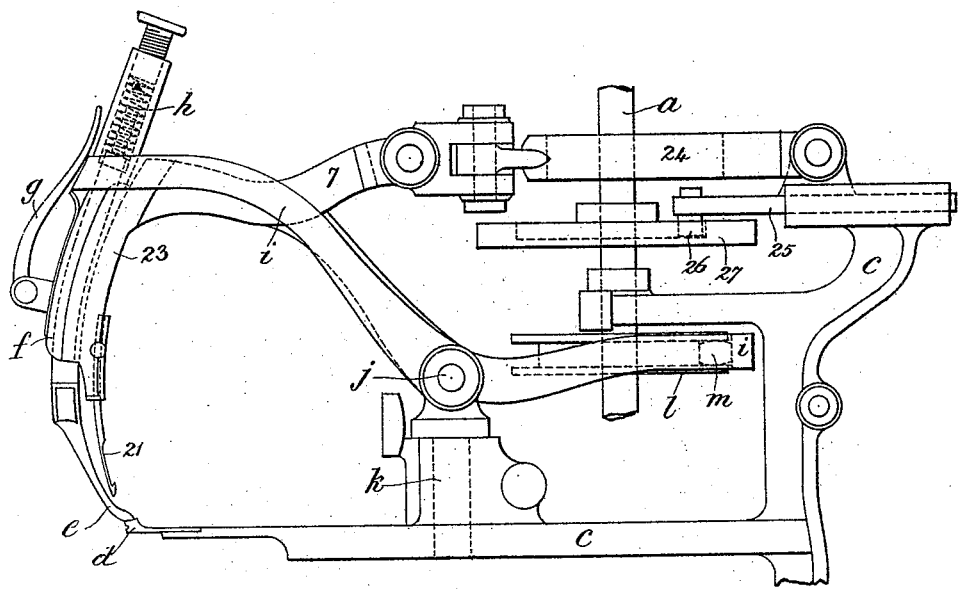
Figure 6:
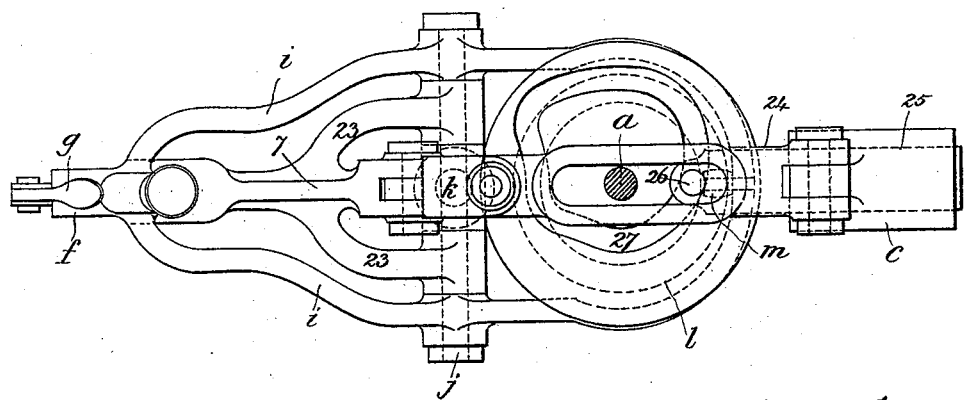
Figure 11:
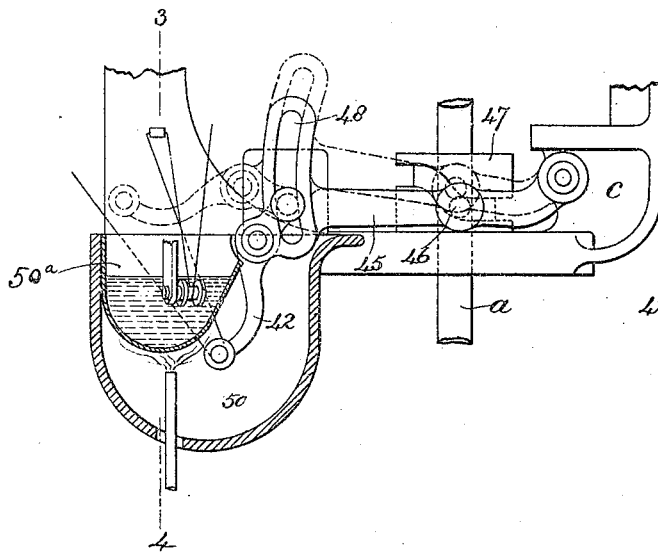
Figure 12:
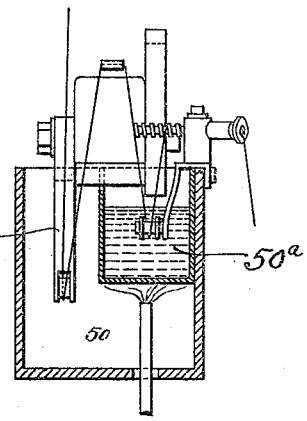
Figures 25, 26:
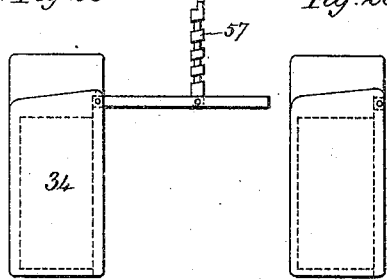
Figure 27:
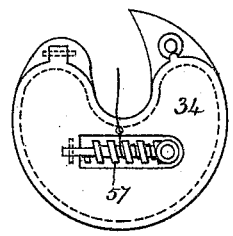
Figures 28, 29:
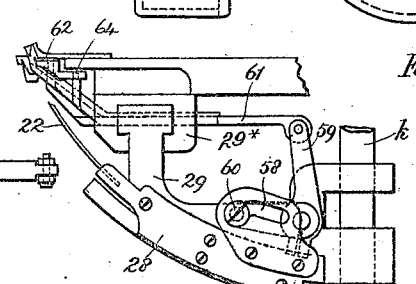
Figure 30:
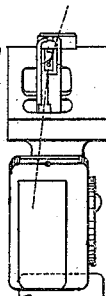

In the accompanying drawings, Figure 1 is a side elevation of a machine embodying the present invention. Fig. 2 is a similar view showing the opposite side of the machine. Fig. 3 is a sectional plan on line 1 2 of Fig. 1. Fig. 4 is a side elevation of the lasting-grippers and cams detached. Fig. 5 is a side elevation detached of the needle-hook and presser-foot and means for operating them. Fig. 6 is a plan view of the same. Fig. 7 shows in side elevation the means for giving an oscillating motion to the shuttle. Fig. 8 is a plan view of the same. Fig. 9 is a side view of the take-up or stitching-tightening mechanism. Fig. 10 is a plan view of the same. Fig. 11 is a view similar to Fig. 9, showing means for waxing the thread. Fig. 12 is a cross-section of line 3 4 of Fig. 11. Fig. 13 is a side view of thread-layer and work-support. Fig. 14 is a front view thereof. Fig. 15 shows in section a turn-shoe being lasted with the lasting-grippers in position. Fig. 16 shows a shoe in position for lasting and welting. Fig. 17 shows the shoe being stitched to the welt. Fig. 18 shows a shoe in the operation of shank or seat lasting and sewing. Figs. 19 are enlarged detail views of the piercing-awl and curved needle. Fig. 20 is a cross-section of the needle and awl interlocked in the act of sewing. Figs. 21 and 22 are side and plan views of the mechanism for moving the parts when the work is fed. Figs. 23 and 24 are plan and side views of the awl-operating mechanism. Figs. 25, 26, and 27 are detached views of the shuttle, showing the tension device; and Figs. 28, 29, and 30 are side and plan views of an arrangement of thread-layer mechanism.

The machine, which is mounted on any suitable support, comprises a vertical driving-shaft $a$, to which shaft rotation is imparted when required by any convenient source of power.

$b$ is a hand-wheel keyed on the shaft $a$ for turning the shaft when the attendant desires to slightly move the parts or to aid in starting the machine.

$c$ is the main framing of the machine, which framing supports the various operating parts in the manner now to be described.

The work is held between a fixed abutment $d$, carried by the framing, and a movable presser-foot $e$. (See Figs. 5 and 6.) The presser-foot is mounted in a curved guide $f$ and is fitted with a lever $g$ to lift it therein against the pressure of a spring $h$ for the insertion of the work. The guide $f$ is carried on the end of a rocking lever $i$, made in the form of a loop and fulcrumed on a cross-head $j$, supported on the extremity of a vertical spindle $k$. The rear end of the lever $i$ embraces a cam-wheel $l$ on the shaft $a$, with the circumferential groove of which cam-wheel engages the bowl $m$, carried by the lever $i$. The cam-groove is so cut as to give a slight lift to the presser-foot by rocking the lever at the moment required.

$n\ n$ are the lasting-grippers, the duty of which is to take hold of the edge of the "upper" and stretch it tightly on the last. The grippers, which are best seen in Figs. 3 and 4, are operated to open and close by means of the cam $o$ on the driving-shaft $a$ and to advance and retire to take their grip and pull on the work by means of the cam $p$ on the same shaft. It will be seen that the jaw $n$ is mounted, preferably elastically, upon the lever $q$, fulcrumed at $r$ on the slide $s$. The lever $q$ is rocked by means of the bowl $t$, to which it is connected by the link $u$, and which is held at the extremity of the pivoted arm $v$ in the cam-groove $o$. The jaw $n$ is jointed to the lever $q$, so that it will give way elastically against the pressure of the spring $w$, so as to avoid undue strain when called upon to grip an extra thickness of work. The spring $w$ is contained in a tube carried by the rear end of the jaw $n$ and is confined between the screw-plug $w'$ and the loose plug $w^2$, which projects through the bottom of the tube and bears elastically against the lever $q$. (See Fig. 4.) The longitudinal movement of the grippers is effected by the cam $p$ rocking the bell-cank lever $x$, which is fulcrumed to the framing and is jointed to the link $y$, which is jointed at the other end to the bracket $z$, pendent from the slide $s$. It will be observed that the link $y$ is connected to the bell-crank lever $x$ by means of a lock-nut which engages with a segmental slot in one of its arms. It is thus permitted by adjusting the position of the lock-nut to increase or diminish the length of stroke of the slide $s$, to which the grippers are secured by lengthening or shortening the throw of the bell-crank lever.

1 and 2 are the smoothing-grippers, which have a lateral movement imparted to them in either direction at the will of the attendant to take the creases out of the upper as the lasting proceeds. These grippers are seen in Figs. 1 and 3. The upper jaw 1 is elastically connected to the lever 3, which is fulcrumed at 8 to a lug formed on the top of the plate 11. This plate 11 rests upon and is pivoted to a horizontal bracket forming part of the frame $c$. The vertical pivot-pin passes down from the under side of the plate 11 through the horizontal bracket and is held by a nut, as shown in Fig. 1, leaving the plate 11 free to rock in a horizontal plane. The lever 3 at its rear end is forked and provided with slots 4 to engage pins 5 5, mounted on opposite sides of the sleeve 6, which slides freely on the vertical spindle $k$. The sleeve 6 carries a bowl 9, which engages in the cam-groove of the cam-wheel 10 on the shaft $a$. The rotation of the cam 10 has the effect of raising and lowering the sleeve 6, thereby moving the jaw 1 up and down by means of the pins 5 and the lever 3.

The lower jaw 2 of the smoothing-grippers is screwed to a pivoted plate 11, having a laterally-extending arm 12. This arm 12, (see Fig. 3) is coupled by a jointed link 13 to a hand-lever 14, pivoted at 15 to a short lever 14$^a$, fulcrumed on the framing. 16 is a branch of the lever 14, extending at right angles therefrom and having at its extremity a bowl 17. This bowl 17 engages with a segmental slot 18 in the lever 19, which is pivoted midway of the length of the slot to a branch of the fixed framing. The lever 19 is caused to rock by means of the cam-wheel 20, into the cam-groove of which extends a bowl carried by the end of the said lever 19. When the bowl 17 of the hand-lever is in the position shown in Fig. 3, opposite the pivot of the slotted lever 19, the rocking of the lever has no effect on the connected parts. When, however, the bowl 17 is thrust by the hand-lever 14 toward one end or other of the slot, the rocking is communicated by the connected parts to the pivoted plate 11, which supports the smoothing-grippers 1 2, thereby giving to the grippers a corresponding movement. The central position of the grippers must be such that sufficient latitude is allowed for movement both ways. The direction of the movement of the grippers laterally after they have taken their grip is initiated by the handle 14, which is moved by the operator to put over the bowl 17 one way or other in the slot 18 when he sees how the creases in the upper are lying as the lasting proceeds.

The sewing of the work is effected by means of the following parts.

21 is a hooked needle, and 22 is an awl cooperating therewith. These instruments are of peculiar form in cross-section and are curved to the same arc. (See Figs. 19 and 20.) The needle, which is situated above the work, is carried by an arm 23, fulcrumed to the cross-head $j$ of the vertical spindle $k$. The arm 23 is placed within the loop of the lever $i$ of the presser-foot (see Fig. 6) and at its end is forked to embrace the guide $f$ of the latter. Reciprocation in an arc is given to the needle by means of a link 24, doubly jointed to the extension 7 of the arm 23. This link 24 is jointed to a slide 25, mounted in the framing, and is reciprocated by the bowl 26 on the said slide, engaging with a cam 27 on the driving-shaft $a$. The awl 22 is mounted on a carrier 28, which moves on a curved race 29, which is mounted upon the vertical spindle $k$, before mentioned, and which in its plan is concentric with said spindle and which runs in a guide 29* of corresponding form, affixed to the framing. (See Figs. 1, 2, and 28.) The said race is reciprocated by a rod 30, (see Figs. 1, 2, and 24,) coupled thereto by a ball-and-socket joint. The rod 30 receives its endwise movement by means of a lever 31, fulcrumed on the framing and having a bowl 32 engaging with the groove of the face-cam 33.

34 is a shuttle mounted vertically in a carrier above the work near the point where the sewing takes place. The oscillation of the shuttle is effected by the finger 35 on the end of the spindle 36. This spindle is grooved spirally, (see Fig. 7,) and in the groove runs the finger 37, pendent from the slide 38. The latter carries a bowl 39, projecting into the groove of the cam-wheel 40, and is thereby moved to and fro, thus rotating backward and forward the spindle 36, and with it the shuttle, as the finger 37 is driven along the spiral groove.

In addition to the above-mentioned instruments of the sewing mechanism there are a thread-layer 41 and a take-up lever 42. The office of the latter is to take up the slack thread from the bobbin 43 and pay it out as required during the formation of the stitch, as well as to tighten the latter. This take-up is shown at Figs. 9, 10, 11, and 12. It is fulcrumed to the framing at its rear end, and at its front end it carries a pulley-wheel for the thread. It is actuated by a pin 44, extending transversely from the lever 45, fulcrumed to the framing at its rear end and carrying a bowl 46, which engages with the groove of the cam-wheel 47 on the shaft $a$. The lever 45 is furnished with a segmental slot 48, which fits onto a stud 49 in the framing and forms a steadying-guide for the lever as it rocks from the drawn to the dotted position and back again.

50 is a pot containing a receptacle 50ª for melted wax, through which the thread passes on its way from the bobbin to the take-up. (See Figs. 11 and 12.)

The thread-layer 41, which is a curved lever, (see Figs. 13, 14, and 15,) is pivoted to the fixed race 29 of the awl-carrier. The awl-carrier has a projecting lug 51, which carries a bowl 52, engaging with the slotted tail of the thread-layer, so that in reciprocating the said awl-carrier imparts rocking motion to the thread-layer, the extent and character of the movement being determined by the form of the slot in the tail thereof.

As an alternative arrangement of thread-laying mechanism that shown at Figs. 28, 29, and 30 may be employed. In this arrangement the awl-carrier 28 has attached to it a plate with a curved slot 58 in it, and through this slot passes a pin 60 on an arm of a bell-crank lever 59, pivoted to the race 29. The other arm of this lever 59 is attached to a rod 61, guided in the race 29, and to the outer end of the said rod 61 is pivoted a small lever 62, provided with a curved slot 63 at its inner end, through which slot a pin 64, fixed to the awl-race 29, passes. The needle-thread passes through a hole in the end of the lever 62, which acts as a thread-layer.

The feeding of the work takes place while the needle and awl are locked together in the work, and the non-slipping of the work when released by the grippers is thereby insured. To this end all the parts concerned in the sewing operation are, as indicated above, mounted to swivel on the vertical spindle $k$ or in line therewith. The swiveling movement is effected by bodily turning the pivot-pin $k$ in the following manner: 53 is a segmental arm (see Figs. 21 and 22) keyed on the shaft $k$, and 54 is a bell-crank lever fulcrumed on the framing. One arm of the lever 54 carries a bowl which engages the cam-groove 55, and the other arm is jointed to the link 56. The other end of the link 56 is adjustably jointed to the segmental arm 53, so that the rocking of the lever 54 by the cam 55 causes the said arm to move and turn the pivot $k$. The extent of movement of the arm 53 is determined by the point at which the link 56 is attached thereto. Thus the further the attachment is away from the center $k$ the greater will be the throw and the longer will be the feed or stitch which will be given to the mechanism.

The tension of the shuttle-thread is regulated by a device illustrated at Figs. 25, 26, and 27. 57 is a flattened screw jointed to the hinged cover of the shuttle. The thread is wound round the screw a sufficient number of times to give the tension desired. Being jointed to the cover, the screw can be raised to facilitate the application of the thread thereto.

The order of the operations of the machine is as follows: To place the work in the machine, the hand-wheel is turned to the point at which the presser-foot rises. The work is then introduced, making use of the presser-foot lever to completely lift the presser-foot, if necessary. When the work is in position, the machine is started, and the awl is caused to rise and pierce the work from below, the work at this time being held firmly down by the presser-foot. Just as the awl emerges from the top side of the work it is joined by the needle, and both needle and awl descend locked together and dwell on the other side of the work. At this point the feeding of the work takes place by swiveling the parts on the pivot $k$, as above described. The further retreat of the awl by itself causes the thread-layer to lay the thread from the bobbin in the open throat of the needle. The latter having received the thread returns through the work, carrying with it the loop paid out by the thread-tightener. When the loop is sufficiently raised, it is entered by the nose of the shuttle, which gradually passes through the said loop. The lasting and smoothing grippers are by this time at work preparing the upper for the next stitch, which takes place when the needle, awl, and parts connected therewith have been returned to their normal position.

What is claimed as the invention, and desired to be secured by Letters Patent, is—

1. In a lasting and sewing machine for boots and shoes, mechanism consisting of the combination of the following elements, viz: a presser-foot and abutment for holding the work, two pairs of gripping-jaws operating in different planes on the upper, a circular shuttle, a curved needle, an awl coöperating with said needle on the opposite side of the work for feeding the latter, a driving-shaft and cams thereon, and connections between said cams, presser-foot, gripping-jaws, needle and awl for producing the feeding movements and for releasing the work from the gripping-jaws and returning the needle and awl to their normal position after feeding, all substantially as described.

2. In a lasting and sewing machine, the combination of lasting and smoothing grippers operating longitudinally and laterally on the upper, a needle, means for maintaining the needle in the work while the work is being fed and after the grippers have been released from the upper to thereby prevent the upper from slipping, means for feeding the work, and means for returning the needle to normal position to take another stitch when the grippers have taken a new grip on the upper.

3. In a lasting and sewing machine, the combination with lasting-grippers of pivotally-mounted smoothing-grippers, one of said smoothing-grippers having an elastically-mounted jaw, means for both positively opening and closing said grippers from the main driving-shaft and means for laterally moving the grippers at the will of the attendant in either direction, substantially as described.

4. In a lasting and sewing machine, the combination with lasting-grippers, of pivotally-mounted smoothing-grippers, one of said smoothing-grippers having an elastically-mounted jaw, a drive-shaft, a cam on the drive-shaft for positively operating the lasting-grippers to both open and close them, and a cam on said shaft for both positively opening and closing the smoothing-grippers.

5. In a lasting and sewing machine, the combination of lasting and smoothing grippers operating longitudinally and laterally on the upper, a needle and awl operating from opposite sides of the work and coöperating with each other, means for maintaining the needle and awl in the work while the work is being fed and after the grippers have been released from the upper to thereby prevent the upper from slipping, means for moving the needle and awl for feeding the work, and means for returning the needle and awl to normal position to take another stitch when the grippers have taken a new grip on the upper.

6. In a lasting and sewing machine, the combination of lasting and smoothing grippers operating longitudinally and laterally on the upper, a pivotally-mounted needle and awl operating from opposite sides of the work and coöperating with each other to feed the work, means for maintaining the needle and awl in the work while it is being fed and after the grippers have been released from the upper to thereby prevent the upper from slipping, and means for swinging the needle and awl in a direction to feed the work and swinging them back to normal position for taking another stitch when the grippers have taken a new grip on the upper.

7. In a lasting-machine, smoothing-grippers pivoted for lateral movement, means for opening and closing said grippers, a pivoted hand-lever operatively connected to said grippers, a lever pivoted intermediate its ends, a cam for rocking said last-named lever, and an arm connected to the lever first named and having an adjustable connection with the lever last named, whereby the operator by shifting the hand-lever can vary the operation of the parts.

In testimony whereof I have signed my name to this specification in the presence of two subscribing witnesses.

JOHN CHARLES KEATS,
*Administrator of the estate of John Keats.*

Witnesses:
JOSEPH GARNER,
ROBERT A. THOMSON.